June 23, 1925.
J. M. WOLL
1,543,637
DEVICE FOR CONTROLLING THE FLOW OF WELLS
Filed April 5, 1923     4 Sheets-Sheet 1
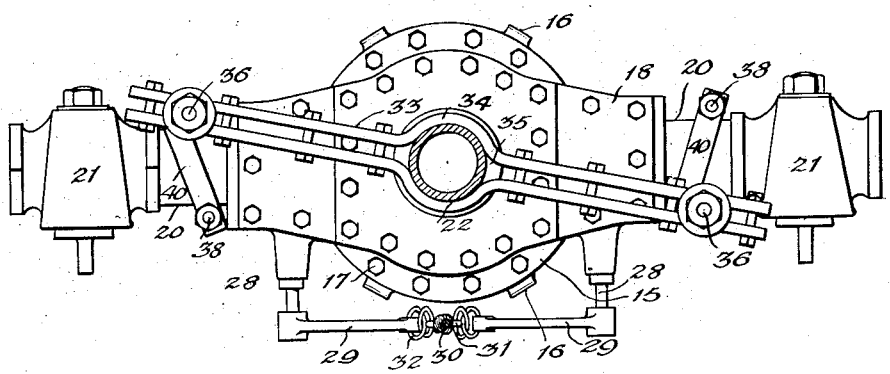
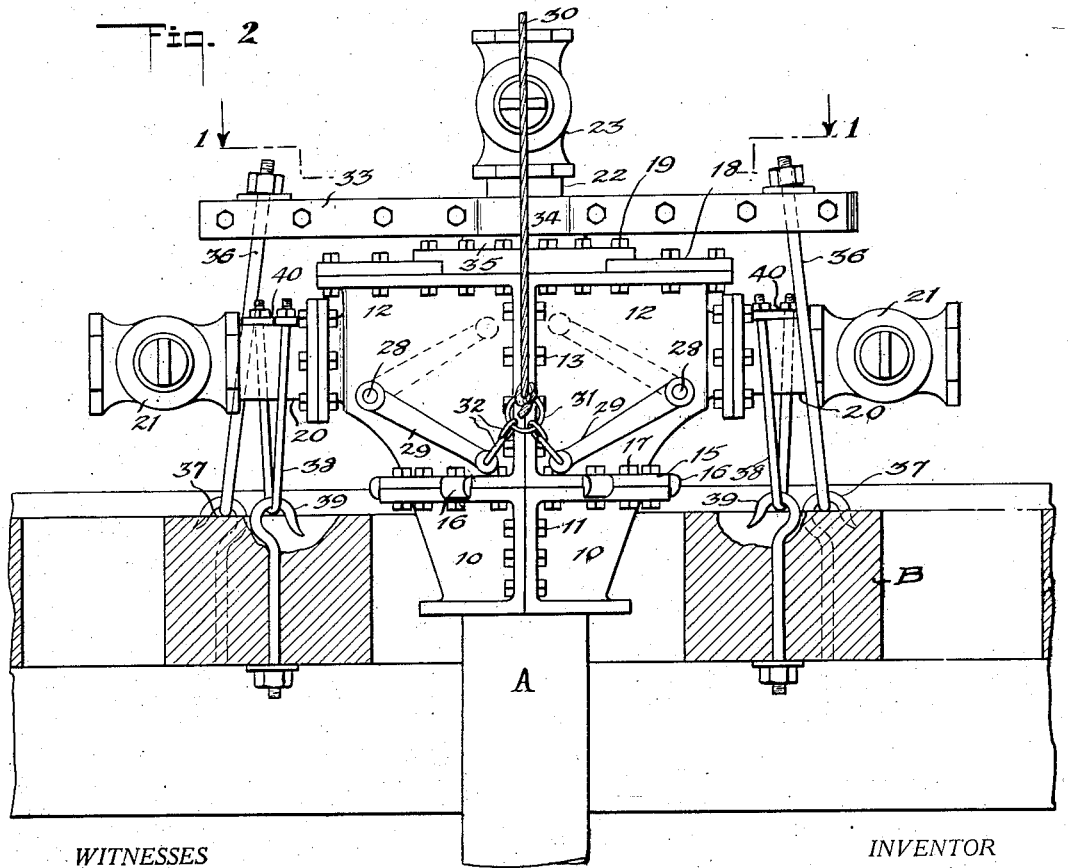
WITNESSES
INVENTOR
J. M. Woll
BY
ATTORNEYS June 23, 1925. 1,543,637
J. M. WOLL
DEVICE FOR CONTROLLING THE FLOW OF WELLS
Filed April 5, 1923  4 Sheets-Sheet 2
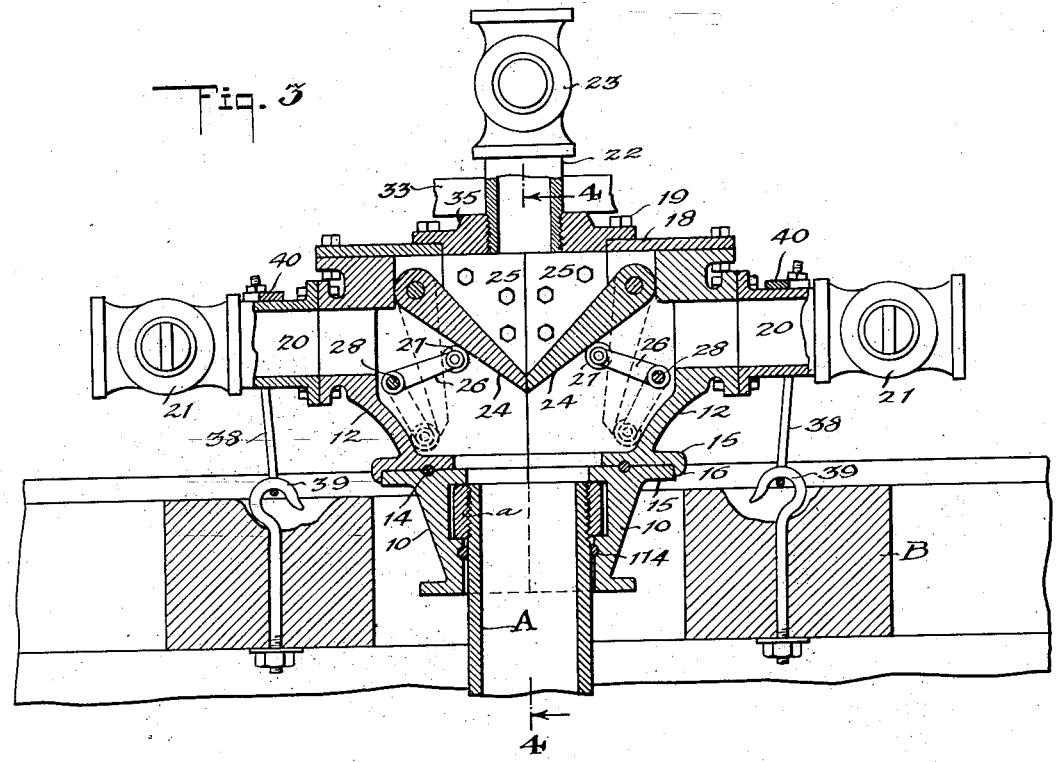
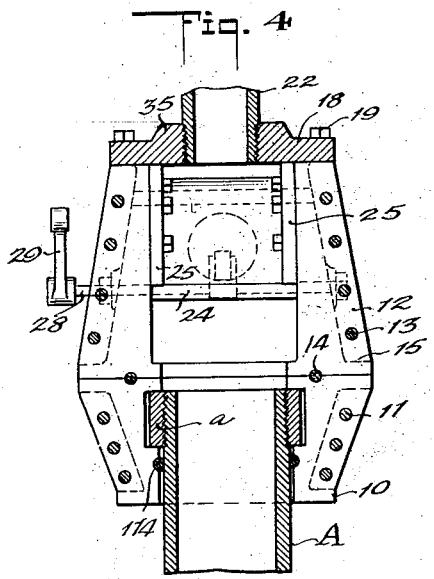
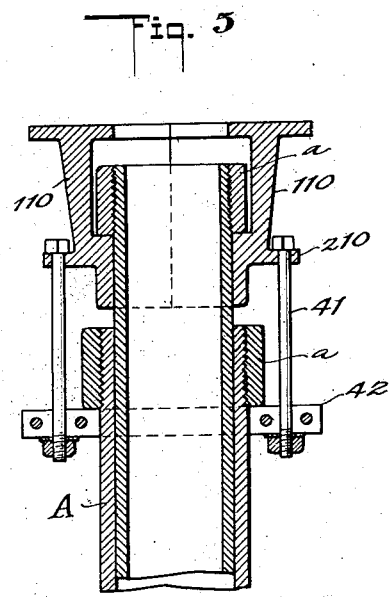
WITNESSES
INVENTOR
J. M. WOLL
BY
ATTORNEYS June 23, 1925. 1,543,637
J. M. WOLL
DEVICE FOR CONTROLLING THE FLOW OF WELLS
Filed April 5, 1923  4 Sheets-Sheet 3

WITNESSES

INVENTOR
J. M. WOLL
BY
ATTORNEYS

June 23, 1925.

J. M. WOLL 1,543,637

DEVICE FOR CONTROLLING THE FLOW OF WELLS

Filed April 5, 1923    4 Sheets-Sheet 4

WITNESSES

INVENTOR
J.M. WOLL

BY

ATTORNEYS

Patented June 23, 1925.

1,543,637

UNITED STATES PATENT OFFICE.

JOHN M. WOLL, OF KITTANNING, PENNSYLVANIA.

DEVICE FOR CONTROLLING THE FLOW OF WELLS.

Application filed April 5, 1923. Serial No. 630,126.

*To all whom it may concern:*

Be it known that I, JOHN M. WOLL, a citizen of the United States of America, and a resident of Kittanning, in the county of Armstrong and State of Pennsylvania, have invented a new and Improved Device for Controlling the Flow of Wells, of which the following is a description.

My invention relates to a means for controlling a voluminous flow from oil or gas wells when said wells form gushers and more particularly the invention relates to a means for controlling the direction of the flow as a preliminary to regulating or cutting off the flow.

The general object of my invention is to provide a novel controlling means as referred to characterized by efficiency in controlling the direction of the flow by valve means manually operable from the exterior of the device as well as to provide a construction reflecting practical considerations with respect to simplicity of construction and facility of assembling and emplacing the installation and looking to the convenient operation of the device.

Reference is to be had to the accompanying drawings forming a part of this specification, it being understood that the drawings are merely illustrative of practical examples of the invention.

Figure 1 is a plan view of my well controlling means with a part in section as indicated by the line 1—1, Figure 2;

Figure 2 is a side elevation of said means;

Figure 3 is a longitudinal vertical section of the device;

Figure 4 is a transverse vertical section as indicated by the line 4—4, Figure 3;

Figure 5 is a detail in vertical section illustrating modified means for securing the body of the device to a well pipe;

Figure 6:
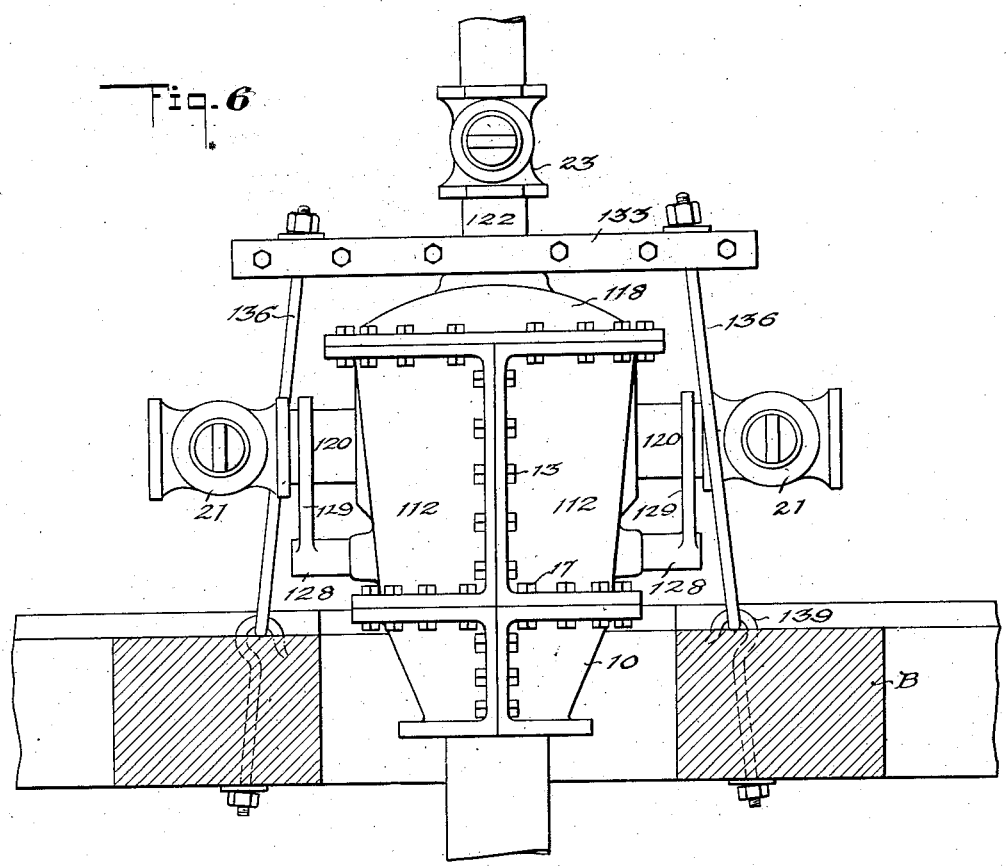
Figure 6 is a side elevation similar to Figure 2 but illustrating a construction somewhat modified.

Referring at first more particularly to the construction shown in Figures 1 to 4 of the drawings, the valve controlling means includes a body made up of a base portion 10 split vertically or formed in two sections adapted to be united by transverse bolts 11 to clamp the same about the upper end of a pipe A about a collar *a* thereon. The upper portion of the body is split or divided vertically being composed of two clamp sections 12 united by transverse bolts 13 at opposite sides. Beneath the under surface of the upper sections 12 and the base sections 10 of the body a gasket 14 is employed and a similar gasket 114 may be employed about the pipe A between the same and the base sections 10. At the bottom of the upper sections 12 and the top of the lower sections 10, said sections are formed with horizontal flanges 15 at opposite sides, the upper flange having a depending alining lug 16 and the connection between the upper and lower sections is completed by vertical bolts 17. The body is provided with a cap 18 secured to the top of the upper sections 12 by bolts 19.

Leading from the body 10 laterally at opposite sides are discharge outlets 20 provided with manually operable controlling valves 21 of any approved construction. Similarly, the cap 18 is provided with a discharge outlet 22 rising therefrom and having a controlling valve 23 of any approved form. Within the upper sections 12 each is provided with a butterfly valve 24, said valves being directly opposite in said sections and swingable on horizontal pivots. In the closed position of the valves 24 they are convergent, the closed position being determined by stop plates 25 secured to the respective sections 12 at the sides. Beneath each valve 24 is a rock arm 26 on a transverse shaft 28, the arm having a roller 27 adapted to contact with the back of the adjacent valve 24 to throw the same toward the closed position. Only a slight manually induced movement of the valve 24 is necessary toward the closed position since a flow of oil or gas in a gusher will automatically complete the closing movement of the valves. Each shaft 28 extends to the exterior of the body and is provided with a lateral arm 29 outside of the body. The respective arms 29 of the shafts 28 are disposed toward each other at a slight angle and they are adapted to be actuated by a vertical rod 30 run to any suitable point of operation. The rod 30 has suitable connections with the pair of arms 29, there being shown a ring 31 to which the rod is tied and additional rings or links 32 running from said ring 31 to the adjacent ends of the respective arms 29.

Normally, when the controlling device is emplaced on a well, the valves 24 are in the open position indicated in dotted lines in Figure 3, whereby the flow upwardly from the well pipe A will pass out through the cap discharge pipe 22 past the valve 23. Should the well become a gusher the rod 30 is caused to exert an upward pull on the arms 29, thereby giving an initial closing movement of the valves 24 whereupon the pressure of the flowing fluid will close the valves against stop plates 25. The valves 21 in the meantime have been opened and the valve 23 will now be closed. The flow will now be laterally through the branches 20 and the divided flow may be regulated by respective valves 21. In order to firmly secure the controlling device on the well frame B I provide a top bearing bar 33 formed of separate side members disposed at the opposite sides of the discharge pipe 22 and curved as at 34 to partially conform to said pipe. The bearing bar 33 rests upon a collar or boss 35 on the cap 18 and it is secured at its ends to the frame B by hook bolts 36 which engage hooks 37 rigid in the frame B. To additionally clamp the controlling means to the frame B I may provide U-bolts 38 engaging with hook bolts 39 on the frame B and passing through bar washers 40 above the discharge branches.

In Figure 5 is shown a means for clamping the base sections (110) when the collars a of two well sections A are in close relation for which purpose the flange members 210 on the base sections 110 have holes through which vertical bolts 41 pass to a split yoke 42 disposed beneath the lower collar a.

Figure 7:
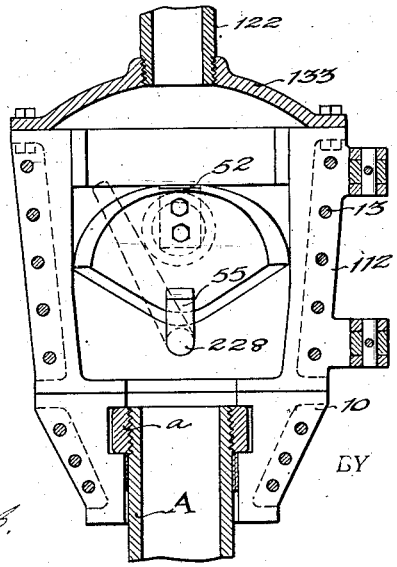
Figure 7 is a vertical section taken in a plane between the sections of the body of the structure shown in Figure 6.
Figure 8:
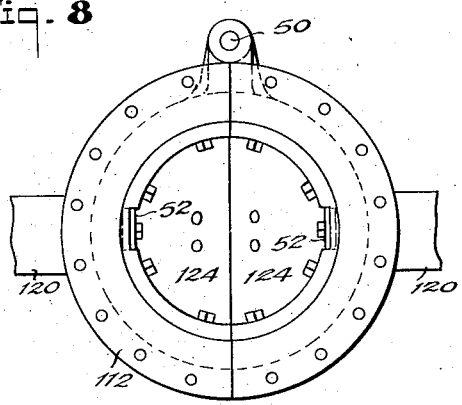
Figure 8 is a plan view with the cap of the body removed, the plane of the section being indicated in line 8—8, Figure 9.
Figure 9:
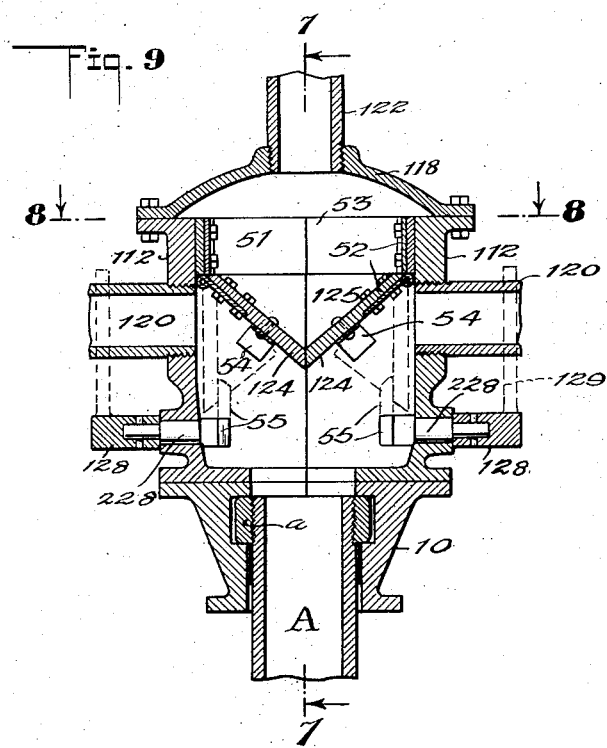
Figure 9 is a vertical section through the construction shown in Figures 6 to 8.

In the form of the invention shown in Figures 6 to 9 substantially the same structure is provided except as to the details of the valve controlling means. Thus, the same base sections 10 are employed and upper sections 112 corresponding in general with the sections 12 and united by transverse bolts 13, the upper and lower sections being held together by bolts 17 as in the first construction. Branches 120 are shown in this instance tapped into the sections 112 directly opposite each other and a cap 118 is employed having a discharge pipe 122 corresponding with the pipe 22. The sections 12 are hinged together in this form by a vertical pivot 50.

The valves 124 are secured by strap hinges 52 to semicircular linings in the respective sections 112 at the top. On each valve 124 is a plate spring 54 slightly deflected at one end to bear against the walls of the sections 112. The valves 124 when the cap 118 is still unplaced are pressed against side walls of the sections 112 in the dotted line position of Figure 9 and closing the branch pipes 120. Said valves 124 are held in the dotted line position and closing the pipes 120 by latch heads 55 on shafts 228 that extend through the walls of the sections 112 to the exterior and have secured thereto the hubs 128 of levers 129 which may be employed to rock the shafts 228 for withdrawing the latch heads 55, thereby releasing the valves 125 and permitting the springs 54 to throw the valves partly to the open position to be subject to the pressure of the flowing oil for the complete movement of the valve to the convergent position closing the flow to the vertical discharge pipe 122.

It will be observed that the valves 24 and 124 are mounted upon the respective sections 112 to be emplaced with the placing of the sections in the assembling of the device and also it will be noted that said valves in the position closing the direct vertical discharge pipe 22 or 122 lie in convergent planes transecting the medial plane of the branch pipes so as to divide and deflect the upwardly flowing stream to the branch pipes 20 or 120.

I would state in conclusion that while the illustrated examples constitute practical embodiments of my invention, I do not limit myself strictly to the exact details herein illustrated, since, manifestly, the same can be considerably varied without departure from the spirit of the invention as defined in the appended claims.

Having thus described my invention, I claim:

1. A means to control the flow of fluid from a well, said means comprising a body adapted to be mounted upon a well pipe and provided with a main vertical discharge, and a lateral branch discharge, said body composed of a split base section, a split upper portion, and means for securing said upper portion to said base section; together with a valve means operable to permit the flow of fluid to said main discharge pipe or to direct the flow to said branch pipe, said valve composed of movable valve members carried by the respective body sections so that the clamping of the sections positions said valve members.

2. A means to control the flow of fluid from a well, said means comprising a body adapted to be mounted upon a well pipe and provided with a main vertical discharge, and a lateral branch discharge, said body composed of a split base section, a split upper portion, and means for securing said upper portion to said base section; together with a valve operable to permit the flow of fluid to said main discharge pipe or to direct the flow to said branch discharges, said valve composed of separate members supported on the respective parts of the split upper portion of the body said valve composed of movable valve members carried by the respective body sections so that the clamping of the sections positions said valve members.

3. A means to control the flow of fluid from the well, said means comprising a body, said body formed of a vertically split base the sections of which are bolted together, a vertically split upper portion the sections of which are bolted together, and means to secure the upper sections to the base sections; a cap covering the sections of the upper portion, said cap having a vertical discharge pipe, lateral discharge pipes on the respective upper sections of the body, and an externally operable valve to permit flow of fluid to said vertical discharge pipe or to direct the flow to said branch pipes, said valve composed of valve members carried by the respective sections so that the clamping of the sections position said valve members.

4. A means to control the flow of fluid from a well, said means comprising a body adapted to be applied to a well pipe, a vertical discharge pipe on said body at the top, lateral discharge pipes on the body at opposite sides and valves movable to positions individually closing the branch pipes or to convergent positions jointly cutting off the flow to said vertical discharge pipe.

5. A means to control the flow of fluid from a well, said means comprising a body adapted to be applied to a well pipe, a vertical discharge pipe on said body at the top, lateral discharge pipes on the body at opposite sides, and valves movable to positions individually closing the branch pipes or to convergent positions jointly cutting off the flow to said vertical discharge pipe, said valves in the last mentioned positions being oblique to and transecting the medial plane of the branch pipes to divide the flowing stream and direct it to the branch pipes.

JOHN M. WOLL.